Patented Apr. 19, 1927.

1,625,622

UNITED STATES PATENT OFFICE.

LELAND L. ODOM, OF LITTLE ROCK, ARKANSAS, ASSIGNOR TO M-O-R PRODUCTS COMPANY, OF LITTLE ROCK, ARKANSAS, A COPARTNERSHIP CONSISTING OF C. C. MONGER, L. L. ODOM, AND J. D. REYNOLDS.

MANUFACTURE OF A SUBSTITUTE FOR TURPENTINE.

No Drawing. Application filed March 18, 1924. Serial No. 700,178.

This invention relates to the manufacture of a substitute for the product known as turpentine in all of the various arts in which it is employed; and has particular reference to a novel composition of matter for forming such substitute, and to a novel process for producing the same.

A primary object of the invention is to produce a substitute for turpentine which shall possess the greater part or all of the desirable qualities of the latter, and so to combine the ingredients for said substitute as to minimize the tendency of said ingredients, or any of them, to become separated, or to be affected otherwise, due to oxidization, or exposure to light, heat, cold, or moisture.

Further objects are to produce a composition of the above character by the use of ingredients which are relatively inexpensive, simple, and readily available, and to afford a novel process by which said ingredients are combined in such a manner as to obtain the most satisfactory results.

To the foregoing ends, the composition consists of a mineral oil, a resinous substance, and a relatively small quantity of alkaline material, combined in substantially the proportions hereinafter recited. The process consists in heating the resinous substance and the alkaline material together, at such a temperature and for such a length of time as to cause the former ingredient to be cut and saponified by the latter; cooling this fluid mixture down to a temperature below the boiling point of the mineral oil to be used; agitating thoroughly the resulting mixture; and, finally, placing it in a still, and distilling down to the end or dry point of the mineral oil.

To accomplish all of the various objects of my present invention, I preferably employ substantially the following composition, which, of course, may be varied within reasonable limits, without departing from the scope of my invention: naphtha, 500 gallons; rosin, 100 pounds; lime, 10 pounds.

In practice, I prefer to use naphtha in the distillation of which it is "cut in" at 52° Baumé, and "cut out" at 48°, so that an approximately 50° distillate results, and the naphtha therefore has a substantially uniform boiling point. Due to its being more readily cut and saponified, and requiring less time and lower temperature, than commercial or hard rosin, when treating it with an alkali, and to its lower cost and its possession of ingredients and qualities not present in the refined product, I preferably use the crude resinous gum, in the form in which it is taken from the tree. For the third ingredient, I use either anhydrous calcium oxide, an alkaline earth, or some other highly-alkaline material.

In carrying out my improved process, the resinous substance and the alkaline material preferably in commercial dry form are first heated together, at a temperature sufficient to entirely melt the former, and reduce it to a fluid state, which temperature I have found to be approximately 340° Fahrenheit if the crude gum is used, or approximately 400° Fahrenheit with hard rosin. The length of time required for this part of the process will depend largely upon the forms in which the foregoing two ingredients are used, but if the heat is maintained for about two hours, in the case of hard rosin, or for a considerably less time with the crude gum, the desired extent of cutting and saponification of the resinous substance ordinarily will be secured. The liquid mixture thus produced is next cooled down to a temperature somewhat below the boiling point of the mineral oil to be used (usually 175° to 200° Fahrenheit), the mineral oil is added, and the mixture thoroughly agitated. It is then placed in a still, and distilled down to the end or dry point of the mineral oil, the distillate thus obtained being the product sought to be manufactured by my improved process. A residue of uncombined alkaline material and resinous material will remain in the still, and the latter may be recovered and combined with a fresh supply of resinous material for further use.

The turpentine substitute produced in accordance with the present invention is a product that will serve as a solvent; that will dissolve, cut, mix with, and become a component part of, paint pigments and varnish gums; and that acts as a dryer to approximately the same extent as turpentine. It does not stain the paint, or other substance, in connection with which it is used; has an odor very similar to that of turpentine; and serves all technical purposes equally well. In addition, I have reason to believe that this substitute possesses some advantages over turpentine, as, for example, in standing a higher flash test.

It is my understanding that, when my substitute is used in connection with paint pigments, or varnish gums, or the like, in the drying of the substitute a residue remains which binds together the particles of such pigments, gums or the like. Such residue, however, must come entirely from the resinous ingredient of my substitute, and not from any part of the mineral oil, which eventually will entirely evaporate.

The manufacture of a substitute for turpentine of the character, and by the process, disclosed herein, results in a product the ingredients of which are combined in a way and to an extent quite different from the results heretofore obtained by the physical blending of a mineral oil with a resinous material, in the effort to produce a turpentine substitute. So far as I know, no such substitute has ever been produced heretofore which is adapted to meet the requirements for turpentine, as used in various arts.

Various modifications of minor details of my invention, as disclosed herein, will doubtless occur to those skilled in the art to which it appertains, and I therefore do not desire to limit my invention to the details of my disclosure.

Having described the invention, what is claimed is:—

1. A process for manufacturing a turpentine substitute which consists in initially combining 100 pounds of resin with 10 pounds of lime, liquefying under heat, subsequently adding thereto 500 gallons of naphtha, and distilling the composition.

2. A turpentine substitute comprising the recovered distillate of a mixture of resin, lime, and a distillate of petroleum.

3. A turpentine substitute comprising the distillate of mixed resin and lime liquefied under heat, to which naphtha is added before distillation.

4. A turpentine substitute comprising the recovered distillate of resin and lime liquefied under heat in a mixture having the proportions of 10 pounds of resin to 1 pound of lime to which naphtha in the proportions of 5 gallons of naphtha to 1 pound of resin is added before distillation.

5. A process for manufacturing a turpentine substitute, which consists in initially combining by mixing, resin and lime, liquefying the mixture by heating, subsequently mixing naphtha therewith, and finally distilling off the product.

In testimony of the foregoing, I affix my signature.

LELAND L. ODOM.